United States Patent
Raz et al.

(10) Patent No.: US 10,817,344 B2
(45) Date of Patent: Oct. 27, 2020

(54) DIRECTED AND INTERCONNECTED GRID DATAFLOW ARCHITECTURE

(71) Applicant: Next Silicon, Ltd., Tel Aviv (IL)

(72) Inventors: Elad Raz, Ramat Gan (IL); Ilan Tayari, Tsur Hadassa (IL)

(73) Assignee: Next Silicon Ltd, Tel Aviv (IL)

( * ) Notice: Subject to any disclaimer, the term of this patent is extended or adjusted under 35 U.S.C. 154(b) by 141 days.

(21) Appl. No.: 16/130,716

(22) Filed: Sep. 13, 2018

(65) Prior Publication Data
US 2019/0079803 A1 Mar. 14, 2019

Related U.S. Application Data

(60) Provisional application No. 62/558,090, filed on Sep. 13, 2017.

(51) Int. Cl.
| | | |
|---|---|---|
| G06F 9/50 | (2006.01) | |
| H04L 12/54 | (2013.01) | |
| G06F 16/901 | (2019.01) | |
| H04L 12/70 | (2013.01) | |

(52) U.S. Cl.
CPC ........ G06F 9/5072 (2013.01); G06F 16/9024 (2019.01); H04L 12/5601 (2013.01); H04L 2012/5672 (2013.01)

(58) Field of Classification Search
CPC .. G06F 9/5072; G06F 9/5066; G06F 16/9024; H04L 12/5601; H04L 2012/5672
See application file for complete search history.

(56) References Cited

U.S. PATENT DOCUMENTS

| | | |
|---|---|---|
| 5,321,806 A | 6/1994 | Meinerth et al. |
| 5,347,346 A | 9/1994 | Shimizu et al. |
| 5,367,653 A | 11/1994 | Coyle et al. |
| 5,933,642 A | 8/1999 | Greenbaum et al. |
| 5,970,254 A | 10/1999 | Cooke et al. |
| 6,347,346 B1 | 2/2002 | Taylor |
| 6,871,341 B1 | 3/2005 | Shyr |
| 7,269,174 B2 | 9/2007 | Olson et al. |
| 8,156,307 B2 | 4/2012 | Wallach et al. |
| 8,230,176 B2 | 7/2012 | Li |
| 8,275,973 B2 | 9/2012 | Toi et al. |
| 8,504,778 B2 | 8/2013 | Kim |

(Continued)

FOREIGN PATENT DOCUMENTS

| | | |
|---|---|---|
| WO | WO 2019/028253 | 2/2019 |
| WO | WO 2019/055675 | 3/2019 |

OTHER PUBLICATIONS

International Search Report and the Written Opinion dated Nov. 15, 2018 From the International Searching Authority Re. Application No. PCT/US2018/045008. (6 Pages).

(Continued)

*Primary Examiner* — Brian D Nguyen

(57) ABSTRACT

A computing grid including an interconnect network including input ports and output ports; a plurality of egress ports; a plurality of configurable data routing junctions; a plurality of logical elements interconnected using the plurality of configurable data routing junctions; a plurality of ingress ports. In an embodiment at least one compute graph is projected onto the computing grid as a configuration of various elements of the computing grid.

22 Claims, 3 Drawing Sheets

(56) References Cited

U.S. PATENT DOCUMENTS

| | | |
|---|---|---|
| 8,589,628 B2 | 11/2013 | Kim |
| 8,621,151 B2 | 12/2013 | Kim |
| 8,656,114 B2 | 2/2014 | Kim |
| 8,767,501 B2 | 7/2014 | Joshi et al. |
| 8,874,847 B2 | 10/2014 | Kim |
| 8,949,550 B2 | 2/2015 | Choi et al. |
| 9,317,437 B2 | 4/2016 | Kim |
| 9,348,756 B2 | 5/2016 | Kim |
| 9,385,715 B2 | 7/2016 | Singh |
| 9,460,012 B2 | 10/2016 | Pricopi et al. |
| 9,563,401 B2 | 2/2017 | Chaudhuri et al. |
| 9,588,773 B2 | 3/2017 | Nicol et al. |
| 9,590,629 B2 | 3/2017 | Nicol |
| 9,692,419 B2 | 6/2017 | Melton et al. |
| 10,503,524 B2 | 12/2019 | Nicholson et al. |
| 2004/0190477 A1 | 9/2004 | Olson et al. |
| 2005/0265258 A1 | 12/2005 | Kodialam et al. |
| 2006/0242288 A1 | 10/2006 | Masurkar |
| 2006/0294150 A1 | 12/2006 | Stanfill et al. |
| 2007/0220522 A1 | 9/2007 | Coene et al. |
| 2009/0055596 A1 | 2/2009 | Wallach et al. |
| 2009/0319754 A1 | 12/2009 | Toi et al. |
| 2010/0332761 A1 | 12/2010 | Li |
| 2011/0099562 A1 | 4/2011 | Mandy et al. |
| 2011/0213950 A1 | 9/2011 | Mathieson et al. |
| 2012/0131277 A1 | 5/2012 | Kim |
| 2012/0131284 A1 | 5/2012 | Kim |
| 2012/0137072 A1 | 5/2012 | Kim |
| 2012/0137119 A1 | 5/2012 | Doerr et al. |
| 2012/0183294 A1* | 7/2012 | Boertjes ............... H04J 14/0204 398/49 |
| 2012/0284379 A1* | 11/2012 | Zievers ................. G06F 30/331 709/222 |
| 2013/0024621 A1 | 1/2013 | Choi et al. |
| 2013/0227222 A1 | 8/2013 | Kim |
| 2014/0025881 A1 | 1/2014 | Joshi et al. |
| 2014/0223110 A1 | 8/2014 | Kim |
| 2015/0046660 A1 | 2/2015 | Kim |
| 2015/0234744 A1 | 8/2015 | Pricopi et al. |
| 2015/0261682 A1 | 9/2015 | Kim |
| 2015/0268963 A1 | 9/2015 | Etsion et al. |
| 2015/0381508 A1* | 12/2015 | Goodson ................ H04L 47/41 370/437 |
| 2016/0098367 A1 | 4/2016 | Etsion et al. |
| 2016/0140259 A1* | 5/2016 | Ponamgi ................ G06F 30/18 703/1 |
| 2016/0342396 A1 | 11/2016 | Kukolich et al. |
| 2017/0277550 A1 | 9/2017 | Zhang et al. |
| 2018/0189063 A1 | 7/2018 | Fleming et al. |
| 2019/0004994 A1* | 1/2019 | Fleming ................ G06F 15/80 |
| 2019/0005161 A1* | 1/2019 | Fleming ............. G06F 12/0888 |
| 2019/0007332 A1* | 1/2019 | Fleming ............. H04L 49/3018 |
| 2019/0018815 A1* | 1/2019 | Fleming ................ G06F 15/825 |
| 2019/0042282 A1 | 2/2019 | Raz et al. |

OTHER PUBLICATIONS

International Search Report and Written Opinion of International Searching Authority for PCT/US2018/050910, ISA/RU, Moscow, Russia, dated Feb. 4, 2019.

International Search Report and the Written Opinion dated Feb. 14, 2019 From the International Searching Authority Re. Application No. PCT/US2018/050910. (6 Pages).

International Search Report and Written Opinion of International Searching Authority for PCT/US2018/045008, ISA/RU, Moscow, Russia, dated Nov. 12, 2018.

International Preliminary Report on Patentability dated Feb. 13, 2020 From the International Bureau of WIPO Re. Application No. PCT/US2018/045008. (6 Pages).

Hartenstein, "A Decade of Reconfigurable Computing: a Visionary Retrospective", CS Department (Informatik), University of Kaiserslautern, Germany, pp. 1-8.

Hartenstein, "Coarse Grain Reconfigurable Architecture", Embedded Tutorial, CS Department (Informatik), University of Kaiserslautern, 2001, pp. 564-570.

International Preliminary Report on Patentability dated Mar. 26, 2020 From the International Bureau of WIPO Re. Application No. PCT/US2018/050910. (6 Pages).

Official Action dated Apr. 1, 2020 from the US Patent and Trademark Office Re. U.S. Appl. No. 16/053,382. (19 pages).

* cited by examiner

DIRECTED AND INTERCONNECTED GRID DATAFLOW ARCHITECTURE

CROSS-REFERENCE TO RELATED APPLICATIONS

This application claims the benefit of U.S. Provisional Application No. 62/558,090 filed on Sep. 13, 2017, the contents of which are hereby incorporated by reference.

TECHNICAL FIELD

The disclosure generally relates to system architectures, and more specifically to embedded computing architectures and reconfigurable computing architectures.

BACKGROUND

As technology advances, the need for stronger processing systems and computing power rapidly increase. Currently, processors are expected to deliver high computational throughput and are highly power efficient. Nevertheless, existing processing systems execute sequential streams of instructions. The instructions are retrieved from, and their results are written to, explicit memory or storage. As such, the execution of sequential streams of instructions suffer from, among other things, power inefficiencies.

Specifically, in some existing processing systems, each dynamic instruction must be fetched and decoded even though programs mostly iterate over small static portions of the code. Furthermore, because explicit storage (for example, a register file or memory) is the only channel for communicating data among instructions, intermediate results are transferred repeatedly between the functional units and register files. These inefficiencies dramatically reduce the energy efficiency of modern processing systems.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a computing grid, comprising an interconnect network including input ports and output ports; a plurality of egress ports; a plurality of configurable data routing junctions; a plurality of logical elements interconnected using the plurality of configurable data routing junctions; a plurality of ingress ports, wherein at least one compute graph is projected onto the computing grid as a configuration of various elements of the computing grid.

BRIEF DESCRIPTION OF THE DRAWINGS

The subject matter disclosed herein is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
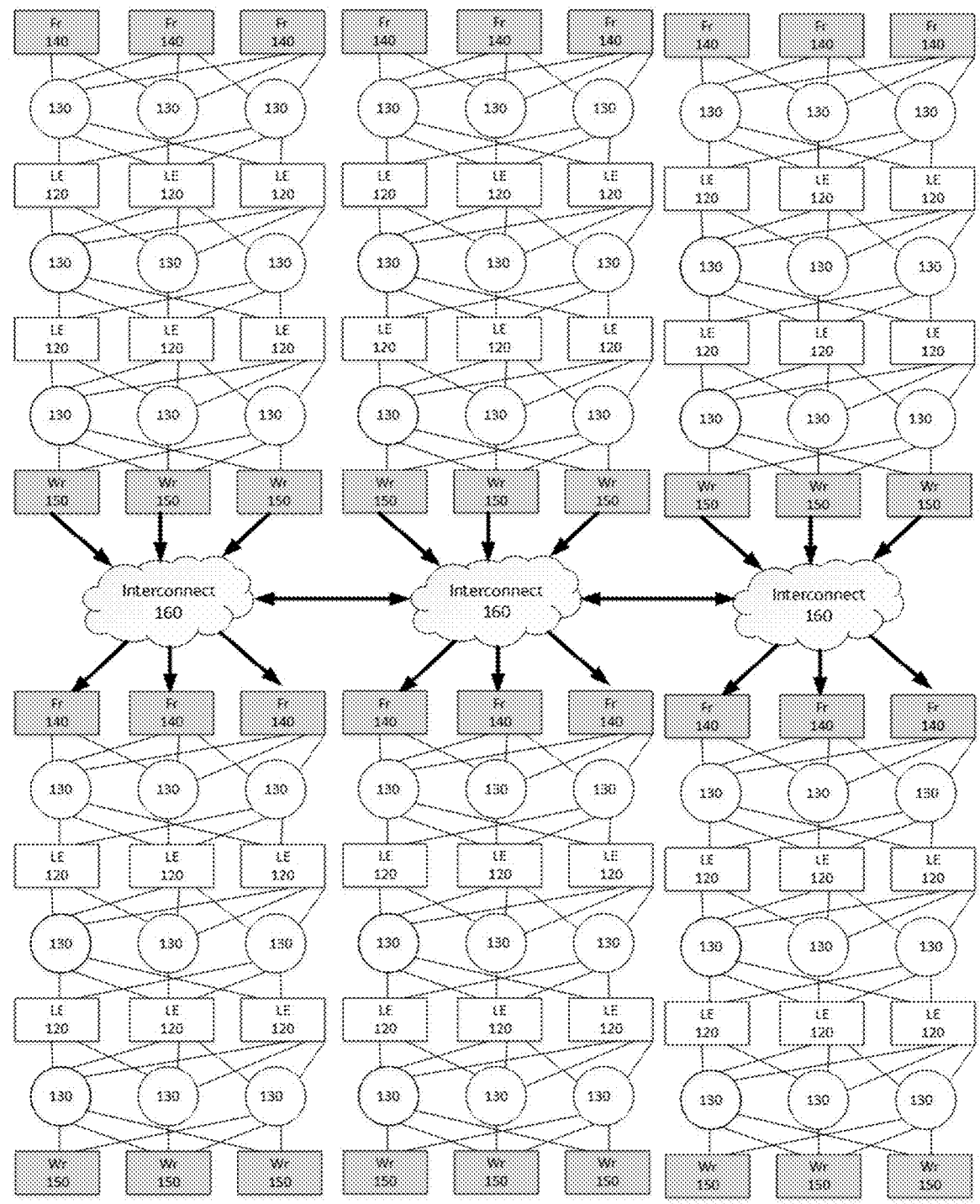
FIG. 1 is a schematic diagram of a computing grid designed according to one embodiment.

The embodiments disclosed by the invention are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments allow for the execution of a software program (including at least one computational task) on a reconfigurable hardware, analyzing in runtime what the program requires, and optimizing the operation based on the analysis. The disclosed embodiments may be realized by a grid computing architecture designed to enable simplification of compute-intensive algorithms or tasks. In an embodiment, the disclosed architecture includes a directed grid configured to receive data flows for processing. The received data flows are interconnected due to the structure of the grid computing architecture.

In an example embodiment, the implementation of the grid computing architecture further enables an asynchronous and clock-less computing implementation. The grid computing architecture is designed to further optimize code execution using a routing topology such as a network, a bus, or both. The routing topology enables routing of execution portions throughout the grid. It should be noted that the grid enables a synchronized implementation.

FIG. 1 depicts an example schematic diagram of a directed, interconnected grid computing architecture 100 (hereinafter the "computing grid 100") according to an embodiment. The computing grid 100 includes an interconnect 160, egress ports (Frs) 140 and ingress ports (Wrs) 150, data routing junctions 130, and logical elements 120 (collectively referred to as LEs 120 or individually as a LE 120).

The LEs 120 are interconnected via the data routing junctions 130. The Frs 140 are connected via the routing junctions 130 to LEs 120 and via the interconnect 160 to Wrs 150, as illustrated in FIG. 1.

In an embodiment, each LE 120 may perform a unary, binary, and/or ternary operation. Examples for such operations include adding, subtracting, multiplying, negating, incrementing, decrementing, adding with carry, subtraction with borrow, and the like.

In an embodiment, a LE 120 may be a logical and/or bitwise operator such as AND, OR, NOT, XOR, size-casting (zero or sign extension) or a combination thereof.

In another embodiment, a LE 120 may be configured to perform a lookup table (LUT) operation.

In yet another embodiment, a LE 120 may be configured to perform a high-level arithmetic function, such as a fixed point or floating-point number addition, subtraction, multiplication, division, exponent, and the like.

In yet another embodiment, a LE 120 may perform a shift operation such as a shift left, a bitwise or arithmetic shift right, and so on.

In yet another embodiment, each LE 120 can execute an operation, do nothing, or pass the information downward to a junction 130 connected thereto. The LE 120 may do nothing when, for example, the condition of a conditional execution configuration (e.g., as determined based on a comparison) is not met.

In yet another embodiment, a LE 120 may perform selection between possible inputs according to a conditional execution configuration.

In an embodiment, each of the data routing junctions 130 may be realized as a multiplexer, a de-multiplexer, a switch, and the like. Each data routing junction 130 is configured to route data to and from the LEs 120. Without departing from the scope of the disclosed embodiments, a data routing junction is illustrated as a MUX 130 in FIG. 1.

In yet another embodiment, the LEs 120 may employ flow control semantics to synchronize data movement in the grid.

Typically, every computer program can be represented by a series of basic-blocks, i.e., blocks of consecutive instructions such that there is no jump from or to the middle of a block. Each basic-block may be represented by a compute graph. A typical compute graph may be a directed acyclic graph in which the nodes correspond to operations and edges correspond to data movement.

Figure 2:
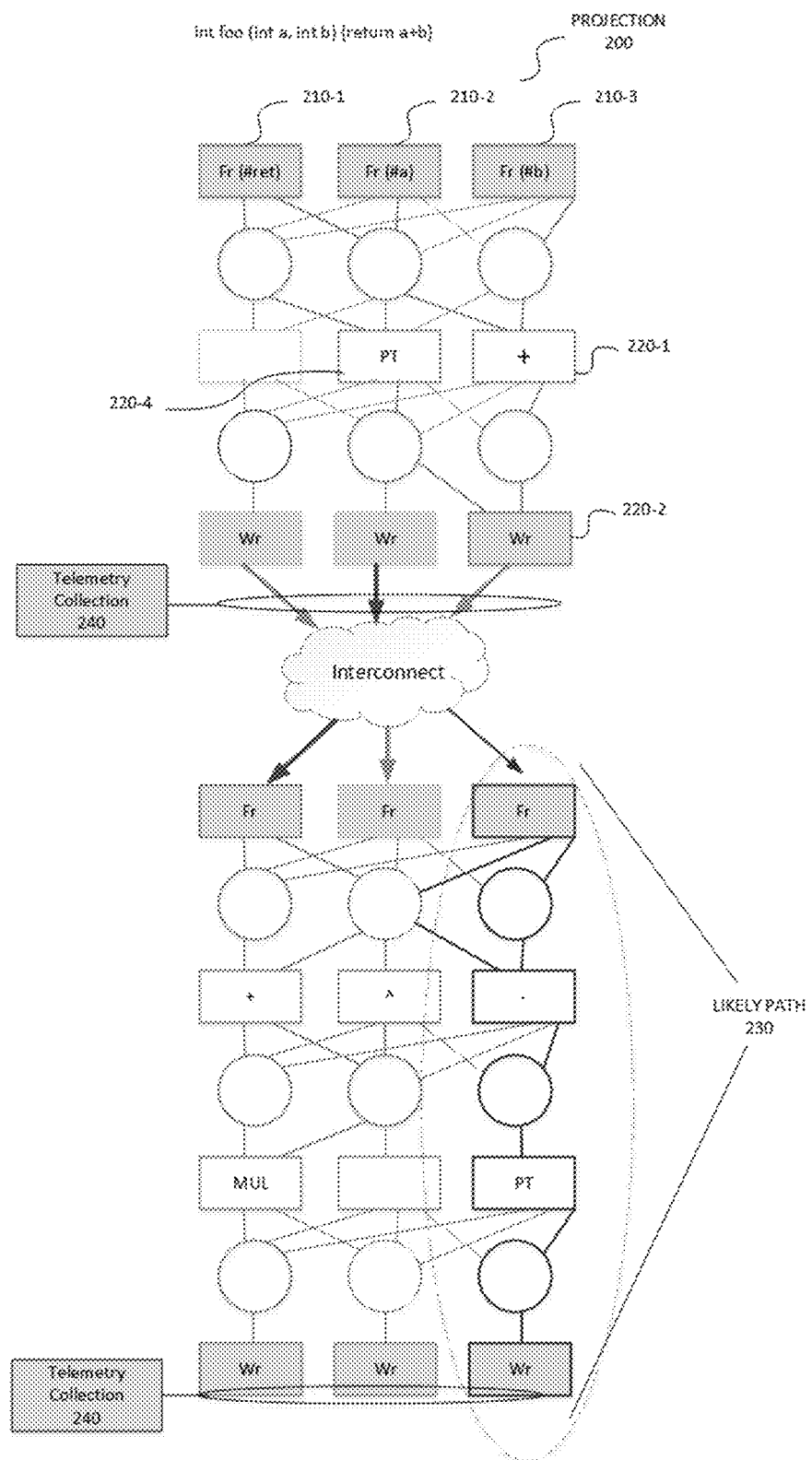
FIG. 2 is a schematic diagram of a compute graph projected and executed on the disclosed computing grid according to an embodiment.

The compute graph may be projected onto the computing grid 100 and, specifically, the nodes of the compute graph (i.e., operations) are assigned to LEs 120 as demonstrated in FIG. 2.

FIG. 2 is a diagram 200 of an example projection of an optimized compute graph onto a computing grid designed according to an embodiment. FIG. 2 further demonstrates collection of runtime telemetry generated by the computing grid for determining the likely path(s).

In the example of FIG. 2, the code to be executed is a function (foo) that receives integer arguments 'a' and 'b' and returns their sum. In this example, the optimized compute graph includes 3 Frs 210-1, 210-2, and 210-3, feeding a return address, and the integer parameters 'a' and 'b' respectively. The selected LE 220-1 performs an addition operation and is connected via data routing junctions to the Frs 210-2 and 210-3. In this example, the selected LE 220-4 does not perform any operation, and acts as pass-through (or NOP).

The Wr 220-2 returns of the sum (a+b) as computed by the LE 220-1. The LE 220-2 is directly connected via data routing junction to LE 220-1. The Wr 220-2 is further connected to LE 220-4 which is connected to Fr 210-1.

According to the disclosed embodiments, based on a piece of code in a programming language, a likely compute path may be determined. In an embodiment, the likely compute path is determined at runtime based on telemetry collected by the telemetry collection circuit 240.

In an embodiment, the collected runtime telemetry includes, for example, information on the number of times that each logic path has been taken, to compute or execute a given function or program. The telemetry may also include parameters, such as flow-control counters (e.g., number of Ack, Pause, etc.). A path which has been taken more times is statistically more likely to be taken again, and therefore a good target for optimization. An example likely path is labeled as 230 in FIG. 3.

In an embodiment, the telemetry collection circuit 240 may be realized as hardware counters at the Wrs 150. In another embodiment, the telemetry collection circuit 240 may be realized as hardware counters at the Frs 140. In another embodiment, the telemetry collection circuit 240 may be realized as hardware counters at the data routing junctions 130. In another embodiment, the telemetry collection circuit 240 may be realized as hardware counters at the interconnect network 160. In another embodiment, the telemetry collection circuit 240 may be realized as hardware counters at the LEs 120 or the flow control mechanism of the LEs 120.

Based on the collected telemetry, the likely compute paths are then optimized, at runtime, by removing bottlenecks in latency, throughput, and the like.

Returning to FIG. 1, in an embodiment, the likely compute path may be optimized by identifying the available resources, such as the LEs 120 and their respective locations in the computing grid 100, in the interconnect 160, or their proximity to critical hardware resources such as memory, a network interface, a host BUS, and the like.

For example, operations in the compute graph of a basic-block that are memory bound may be relocated in close proximity to a memory of the computational device (not shown). As another example, I/O related operations are relocated in close proximity to I/O devices (not shown) such as network ports, PCI-e bus, and the like. A technique for optimizing the path based on critical hardware resources is disclosed in U.S. patent application Ser. No. 16/053,382, the contents of which are incorporated herein by reference.

In an embodiment, the likely compute path may be optimized by identifying the proximity or lack thereof, of basic-blocks to one another, respective to the call-graph of the basic blocks. Proximity, in such cases, may be physical, logical, topological or otherwise such that it may affect overall performance or cost of the computation.

Thereafter, the optimized compute graph is projected onto the computing grid 100. It should be noted that an optimized compute graph can be further optimized at runtime and injected to the interconnected LEs again, on-the-fly.

In some example embodiments, the LEs 120, the data routing junctions 130, the Frs 140 and the Wrs 150 may be implemented in hardware, software, firmware, or any combination thereof. In an exemplary embodiment, the computing grid 100 (and its various elements) is implemented as a semiconductor device. In another embodiment, the computing grid 100 is implemented in part as a semiconductor device and in part as software, firmware, or a combination thereof.

In an embodiment, the computing grid 100 is configured to accelerate the operation of computational devices. Examples for such devices may include a multi-core central processing unit (CPU), a field-programmable gate array (FPGA), a graphics processing unit (GPU), an application-specific integrated circuit (ASIC), a quantum computer, an optical computing device, a neural-network accelerator, or a combination thereof. According to the disclosed embodiments, the acceleration is achieved by, for example, executing program code over the computing grid 100 instead of over a computational device (not shown). Furthermore, the computing grid 100 may be incorporated in a computation device or connected to it.

Figure 3:
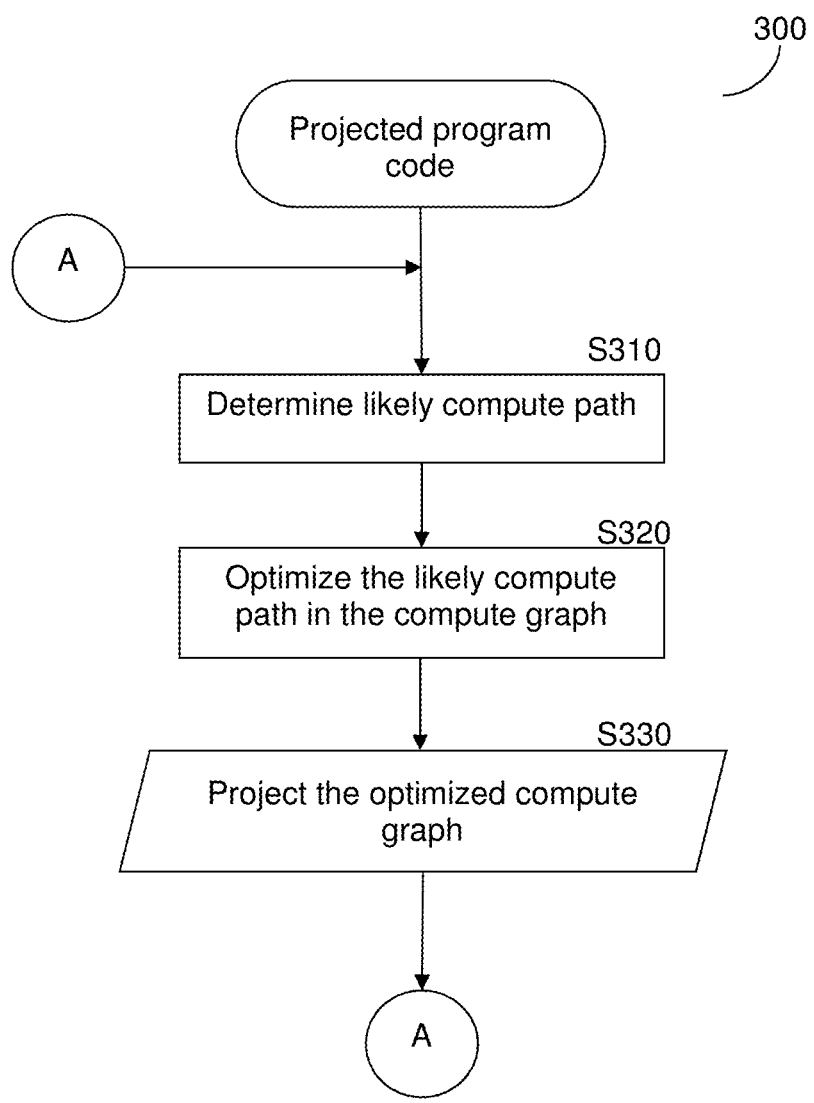
FIG. 3 is a flowchart illustrating a method for compute graph optimization and reconfiguration on a computing grid, according to an embodiment.

FIG. 3 shows an example flowchart 300 of a method for reconfigurable code projection according to an embodiment. In an embodiment, the method is performed with respect to a computing grid (e.g., the computing grid 100, FIG. 1).

At S310, a likely compute path is determined for a received portion of code or program logic. In an embodiment, the likely compute path is determined using runtime telemetry.

At S320, the likely compute path is optimized in the compute graph. The optimization is performed at runtime, to remove bottlenecks in latency or/and throughput. Various embodiments for performing the optimization are discussed above.

At S330, the optimized compute graph is projected and injected again to the computing grid. Then, execution returns to S310.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric, storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A device for executing, by at least one computational device, a software program comprising a plurality of basic code blocks, the device comprising:
   at least one interconnected computing grid, connected to the at least one computational device, comprising:
   a plurality of configurable data routing junctions;
   a plurality of reconfigurable logical elements, comprising a first set of reconfigurable logical elements connected by some of the plurality of configurable data routing junctions, and at least one second set of reconfigurable logical elements connected by some other of the plurality of configurable data routing junctions; and
   at least one interconnect network, connected to the first set of reconfigurable logical elements and the at least one second set of reconfigurable logical elements;
   wherein the at least one interconnected computing grid is configured to execute at least some of the plurality of basic code blocks by:
   configuring the at least one interconnect network to connect the first set of reconfigurable logical elements to the at least one second set of reconfigurable logical elements;
   configuring the first set of reconfigurable logical elements to execute at least one first basic code block of the plurality of basic code blocks;
   configuring the at least one second set of reconfigurable logical elements to execute at least one second basic code block of the plurality of basic code blocks; and
   delivering from the first set of reconfigurable logical elements to the at least one second set of reconfigurable elements via the at least one interconnect network at least one computed value computed by the first set of reconfigurable logical elements by executing the at least one basic code block, wherein the at least one second set of reconfigurable logical elements executes the at least one second basic code block.

2. The device of claim 1, wherein the at least one interconnected network comprises a plurality of ingress ports and a plurality of egress ports;
   wherein at least one first reconfigurable logical element of the first set of reconfigurable logical elements is connected to at least one ingress port of the at least one interconnect network via at least one first configurable routing junction of the plurality of configurable data routing junctions; and
   wherein at least one second reconfigurable logical element of the at least one second set of reconfigurable logical elements is connected to at least one egress port of the at least one interconnect network via at least one second configurable routing junction of the plurality of configurable data routing junctions.

3. The device of claim 2,
   wherein configuring the at least one interconnect network to connect the first set of reconfigurable logical elements to the at least one second set of reconfigurable logical elements comprises:
   configuring the at least one first configurable routing junction to deliver the at least one computed value from the at least one first reconfigurable logical element to the at least one ingress port;
   configuring the at least one interconnect network to deliver the at least one computed value from the at least one ingress port to the at least one egress port; and
   configuring the at least one second configurable routing junction to deliver the at least one computed value from the at least one egress port to the at least one second reconfigurable logical element.

4. The device of claim 1, wherein at least one reconfigurable logical element of the plurality of reconfigurable logical elements is connected to at least one other reconfigurable logical element of the plurality of reconfigurable logical elements via at least one configurable data routing junction of the plurality of configurable data routing junctions.

5. The device of claim 1, wherein at least one configurable data routing junction of the plurality of configurable data routing junctions is one of: a multiplexer, a de-multiplexer, and a switch.

6. The device of claim 1, wherein at least one reconfigurable logical element of the plurality of reconfigurable logical elements is configured to perform one of: a unary operation, a binary operation, a ternary operation, and a conditional operation.

7. The device of claim 1, wherein at least one reconfigurable logical element of the plurality of reconfigurable logical elements is configured to perform at least one operation of a set of operations consisting of: logical AND, logical OR, logical exclusive-OR (XOR), logical NOT, bitwise AND, bitwise OR, bitwise XOR, bitwise NOT, addition, subtraction, multiplication, division, negation, addition with carry, subtraction with borrow, table-lookup (LUT), a fixed-point arithmetic operation, a floating point arithmetic operation, a bitwise shift operation, an arithmetic shift operation, a pass-through operation, and no operation (NOP), a sign extension operation, and a zero extension operation.

8. The device of claim 7, wherein the at least one reconfigurable logical element is configured to perform the at least one operation subject to a result of comparing at least one conditional execution configuration value to at least one configuration condition value.

9. The device of claim 1, wherein the at least one computational device is selected from a group of computational devices consisting of: a multi core central processing unit (CPU), a field-programmable gate array (FPGA), a graphics processing unit (GPU), an application-specific integrated circuit (ASIC), a quantum computer, an optical computing device, and a neural-network accelerator.

10. The device of claim 1, wherein the device is the at least one computational device such that the at least one interconnected computing grid is incorporated in the at least one computational device.

11. The device of claim 1, wherein the at least one interconnected computing grid further comprises at least one telemetry collection circuit.

12. The device of claim 11, wherein the at least one telemetry collection circuit comprises at least one of: a hardware counter in an ingress port, a hardware counter in an egress port, a hardware counter in a configurable data routing junction, a hardware counter in the at least one interconnect network, a hardware counter in a reconfigurable logical element, and a hardware counter in a flow control mechanism of a reconfigurable logical element.

13. The device of claim 1, wherein the at least one interconnected computing grid is further configured to execute some other of the plurality of basic code blocks by:
identifying another first set of reconfigurable logical elements of the plurality of reconfigurable logical elements, and identifying at least one other second set of reconfigurable logical elements of the plurality of reconfigurable logical elements;
configuring the other first set of reconfigurable logical elements to execute another at least one first basic code block of the plurality of basic code blocks;
configuring the at least one other second set of reconfigurable logical elements to execute at least one other second basic code block of the plurality of basic code blocks; and configuring the at least one interconnected network to connect the other first set of reconfigurable logical elements to the at least one other second set of reconfigurable logical elements.

14. The device of claim 13, wherein the at least one interconnected computing grid is further configured to execute some other of the plurality of basic code blocks while executing the at least some of the plurality of basic code blocks.

15. The device of claim 1, wherein the at least one interconnected computing grid is configured to execute the at least some of the plurality of basic code blocks asynchronously.

16. The device of claim 1, wherein the at least one interconnected computing grid is configured to execute the at least some of the plurality of basic code blocks synchronously.

17. A method for executing a software program comprising a plurality of basic code blocks, the method comprising:
configuring at least one computational device to execute some of the plurality of basic code blocks; and
configuring at least one interconnected computing grid to execute some other of the plurality of basic code blocks, the interconnected computing grid comprising a plurality of configurable data routing junctions, a plurality of reconfigurable logical elements, comprising a first set of reconfigurable logical elements connected by some of the plurality of configurable data routing junctions, and at least one second set of reconfigurable logical elements connected by some other of the plurality of configurable data routing junctions, and at least one interconnect network, connected to the first set of reconfigurable logical elements and the at least one second set of reconfigurable logical elements by:
configuring the at least one interconnect network to connect the first set of reconfigurable logical elements to the at least one second set of reconfigurable logical elements;
configuring the first set of reconfigurable logical elements to execute at least one first basic code block of the plurality of basic code blocks;
configuring the at least one second set of reconfigurable logical elements to execute at least one second basic code block of the plurality of basic code blocks; and
delivering from the first set of reconfigurable logical elements to the at least one second set of reconfigurable elements via the at least one interconnect network at least one computed value computed by the first set of reconfigurable logical elements by executing the at least one basic code block, wherein the at least one second set of reconfigurable logical elements executes the at least one second basic code block.

18. The method of claim 17, further comprising computing a plurality of compute graphs, each computed for one of the plurality of basic code blocks;
wherein the first set of reconfigurable logical elements is configured to execute the at least one first basic code block by projecting at least one first compute graph associated with the at least one first basic code block to the first set of reconfigurable logical elements; and
wherein the at least one second set of reconfigurable logical elements is configured to execute the at least one second basic code block by projecting each of at least one second compute graph associated with the at least one second basic code block to one of the at least one second set of reconfigurable logical elements.

19. The method of claim 18, wherein the at least one first basic code block and the at least one second basic code block are identified according to at least one likely execution path identified in the plurality of basic code blocks.

20. The method of claim 19, wherein the at least one likely execution path is identified to optimize at least one metric selected from: a cost of execution, latency of execution, and throughput of execution.

21. The method of claim 20, further comprising:
- receiving from the at least one interconnected computing grid a plurality of telemetry values collected by at least one telemetry circuit of the at least one interconnected computing grid;
- identifying according to the plurality of telemetry values at least one new likely execution path, identified to optimize the at least one metric;
- identifying at least one likely basic code block according to the at least one new likely execution path;
- identifying another first set of reconfigurable logical elements of the plurality of reconfigurable logical elements, and identifying at least one other second set of reconfigurable logical elements of the plurality of reconfigurable logical elements; and
- configuring at least one of the other first set of reconfigurable logical elements and the at least one other second set of reconfigurable logical elements to execute the at least one likely basic code block.

22. The method of claim 21, wherein at least one of the plurality of telemetry values is selected from a group of telemetry values consisting of: an amount of times a path has been taken, and a flow-control counter value.

* * * * *